United States Patent
Calhoun et al.

(10) Patent No.: US 8,094,043 B2
(45) Date of Patent: Jan. 10, 2012

(54) ROAD MAP WITH INDICATED ROAD SEGMENTS

(76) Inventors: Scott Calhoun, Waco, TX (US); Court Barlin Butler, Gypsum, CO (US); Joyce Ann Butler, Eagle, CO (US)

( * ) Notice: Subject to any disclaimer, the term of this patent is extended or adjusted under 35 U.S.C. 154(b) by 367 days.

(21) Appl. No.: 12/460,971

(22) Filed: Jul. 27, 2009

(65) Prior Publication Data
US 2010/0225103 A1 Sep. 9, 2010

Related U.S. Application Data

(60) Provisional application No. 61/208,986, filed on Mar. 3, 2009.

(51) Int. Cl.
G08G 1/123 (2006.01)
(52) U.S. Cl. .... 340/995.24; 40/904; 283/34; 340/995.1; 434/150; 701/201
(58) Field of Classification Search .. 340/995.1–995.24; 701/200, 201; 715/818; 40/904; 283/34; 434/150
See application file for complete search history.

(56) References Cited

U.S. PATENT DOCUMENTS

| 1,487,613 | A | * | 3/1924 | Shaw | 283/34 |
| 6,276,723 | B1 | * | 8/2001 | Willard | 283/34 |
| 2004/0044469 | A1 | * | 3/2004 | Bender et al. | 701/208 |
| 2007/0009863 | A1 | * | 1/2007 | Hart et al. | 434/150 |
| 2009/0113296 | A1 | * | 4/2009 | Lacy et al. | 715/700 |
| 2009/0326797 | A1 | * | 12/2009 | Tengler et al. | 701/200 |

* cited by examiner

*Primary Examiner* — Brent Swarthout

(57) ABSTRACT

One embodiment is to visually direct the focus of the user to specific road segments on a road map surface by the use of colors or symbols overlaid on certain roadways shown on a road map. In numerous embodiments, it will provide the user with a quick visual reference to the location of certain road segments which meet the map designers pre-requisite criteria which would vary for different types of maps, and which would visually indicate different levels of enjoyment that could be anticipated or expected along these certain road segments by the use of various colors or shades of colors, or the use of symbols of various sizes such as dots or stars. Our application would respond to the unfulfilled needs of certain segments of the travelling public such as motorcyclists and RVers, their desire often for enjoyment more than expediency.

4 Claims, 3 Drawing Sheets

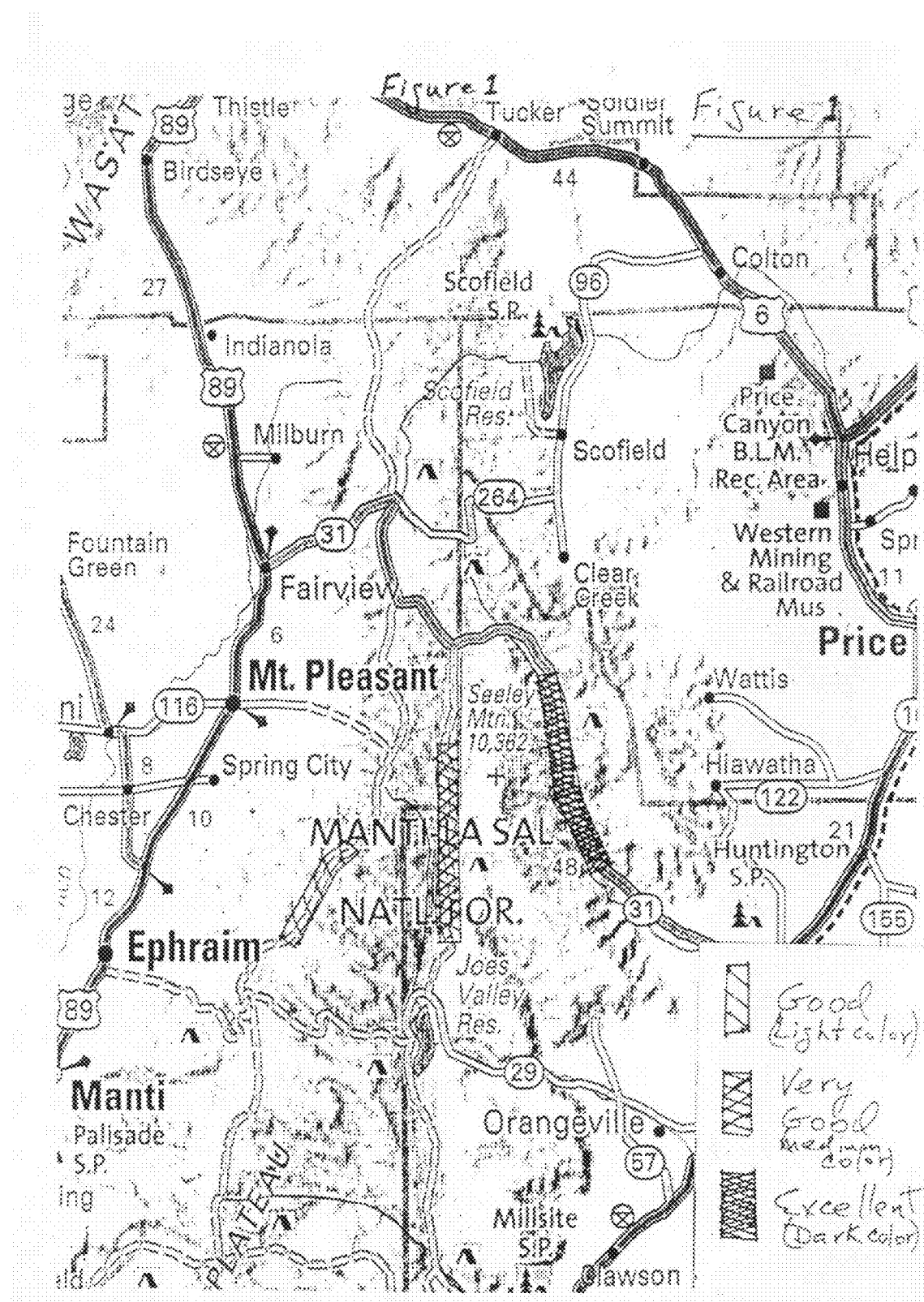

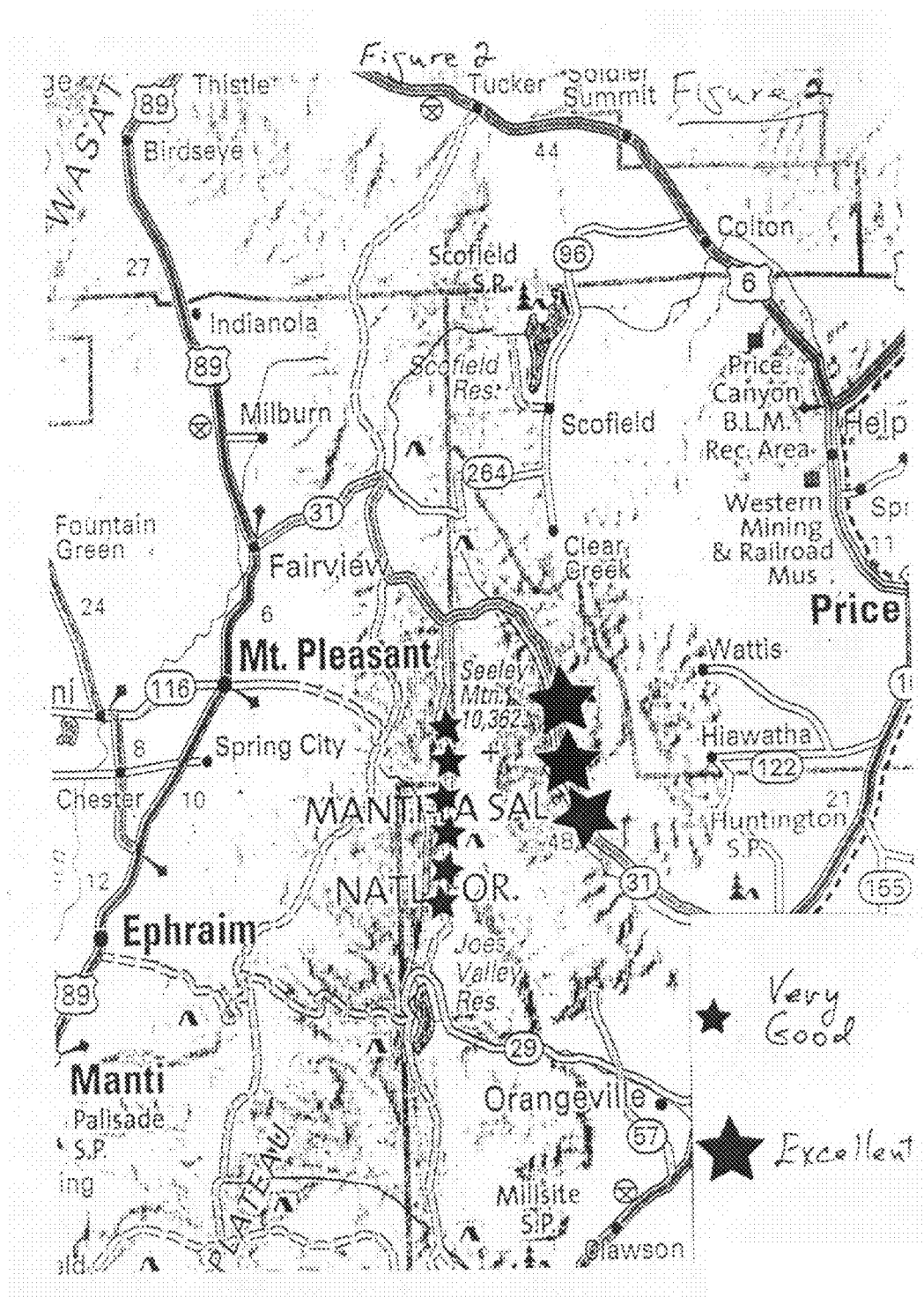

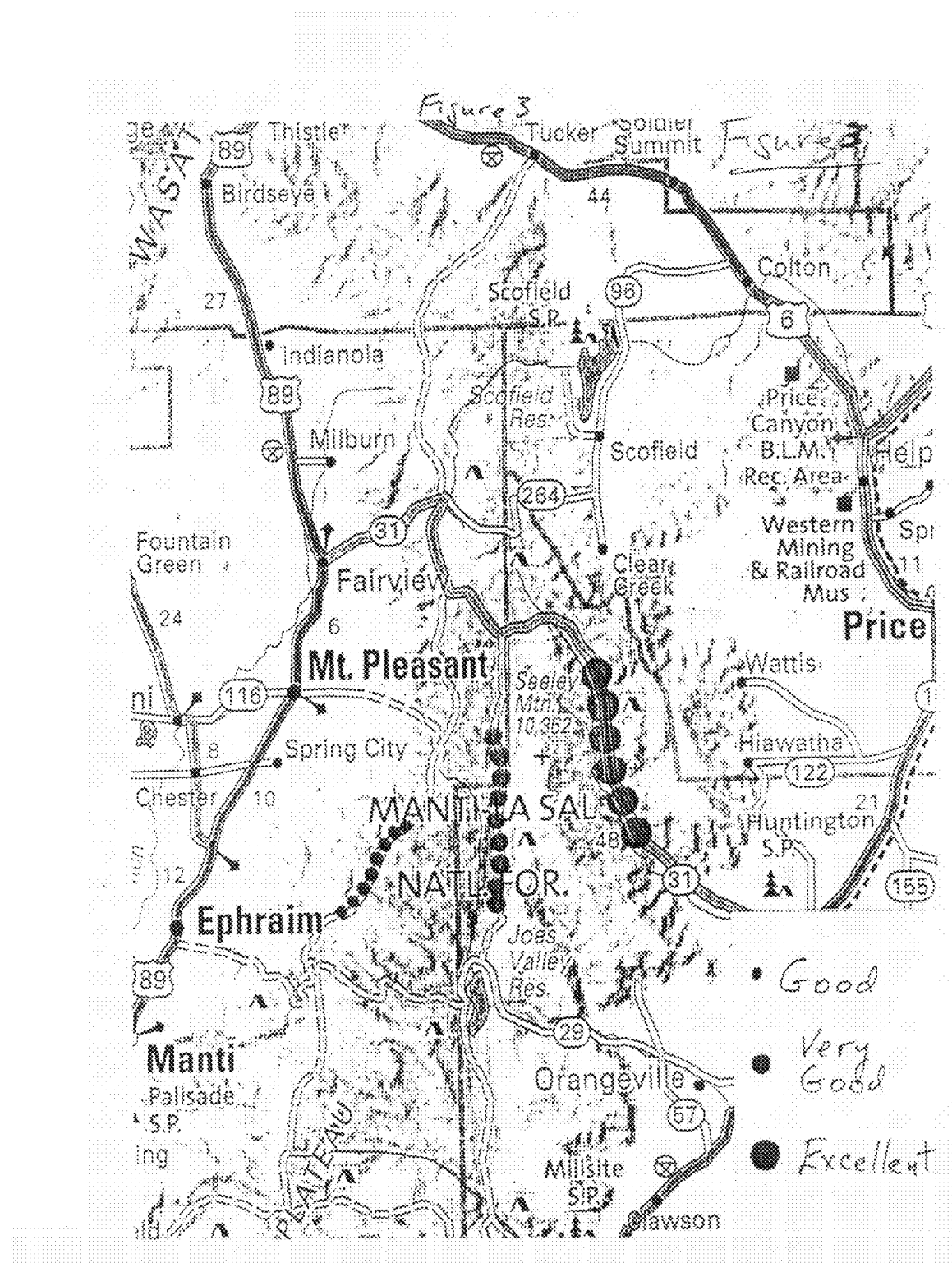

ROAD MAP WITH INDICATED ROAD SEGMENTS

This application is based on a Provisional Patent Application No. 61/208,986 dated Mar. 3, 2009, priority of which is claimed.

BACKGROUND

1. Field

This application relates to road maps, specifically to indications on such maps which will focus the attention of the user to designated segments that conform to certain criteria established by the map designer.

2. Prior Art

Most road maps are marketed as the foldable paper or laminated type made available through convenience stores and related tourist dispensaries; many of these maps have the same basic features, such as: (i) one side is the map surface with numbered highways and roads, names of towns and cities, distance notations between designated towns and cities, county and/or state boundary lines, color shading that denotes public areas such as national or state forests or parks, and points of interest such as national and state monuments, historic trails, lakes, rivers and conspicuous mountain peaks and ranges, e.g., Pike's Peak, Teton Range, etc; (ii) the reverse side might display cities and towns in a larger scale, photos of points of interest, a legend, and information relating to points of interest demarked on the apposing side of the map; furthermore, this side of the map may depict an index for cities and towns to enable the viewer to locate them on the reverse side; a city or town usually may correspond with a certain number and letter code, e.g. "L 10"; the viewer would locate the letter L along the top edge of the map, then find the number 10 along the side edge of the map, then transfix an imaginary line from each to a point of intersection on the surface of the map where the specified city or town would be found.

SUMMARY OF THE INVENTION

An object of this invention is to visually direct the focus of the user to specific highway or road segments on a road map surface by the use of colors, symbols, and/or alterations to the texture of the surface of the map, e.g., mechanically created indentions, bumps, ridges or other modifications of the otherwise flat surface of the map. In numerous embodiments, it will provide the user with a quick visual reference to the location of certain road segments which the map designer has determined meet the pre-requisite criteria that would vary for different types of maps, which would visually indicate different levels of enjoyment that could be anticipated or expected along these certain road segments by the use of various colors, symbols, or other modifications to the map surface; as an example and in the case of a motorcycle roadmap, it could depict a high mountain pass with dramatic views and a twisting roadway that would likely be a good experience for a motorcyclist; by way of illustration, many motorcyclists may have heard of Beartooth Pass in Montana, but would have no idea how or where to locate it or ascertain the level of motorcycle experience that could be expected along the Pass— assuming that they might find it (Beartooth Pass) on a regular roadmap by using the index and code as described in the preceding section ("L 10"), even then when they locate the general area by use of the intersecting method they would not know where the pass begins or ends or where the most dramatic parts of the ride can be expected along its reaches. To further illustrate a map incorporating one embodiment of our application, e.g. Beartooth Pass would appear on the map with various shades of gold overlaid over the existing roadway indicating the length of the Pass, each shade indicating a different level of riding experience, i.e., a dark gold line would indicate the most dramatic and thrilling portions of the ride, a lighter shade of gold for the portion that, while still dramatic and thrilling, would be considered a subjective grade below the dark gold segments, and so on perhaps with even lighter shades of gold indicating other good, but less dramatic sections of roadway along the length of such pass. The user could be further guided by mile marker indications, which would be provided on the map, and could thereby determine not only where Beartooth Pass begins or ends, but where the most dramatic parts of the ride can be expected.

Continuing with the motorcycle map example, in the state of Colorado there will be numerous road segments that meet the criteria for exceptional motorcycle rides. When a motorcyclist opens a map which incorporates this application, he/she will see various shades of gold lines of different lengths interspersed across the state, each one indicating an exceptional experience for a motorcyclist; and this would be the main disparity between what the existing prior art (road maps) display, and what this application would serve for a specific genre' of highway user (motorcycles). The solid gold line is just one embodiment of many possible ways of indicating these certain road segments; others might include cross hatching, dashed lines or other symbols such as small stars along the length of the road segment. Again, various colors or shades of color might indicate the level of the experience that one might expect as in FIG. 1, e.g., a solid and dark gold line is the best possible experience, a lighter shade of gold is still at the optimum level, but not to the extent of the solid/dark gold line, and still a lighter shade of gold for another level of experience; another embodiment might indicate the level of the experience that can be expected by using various sized stars as in FIG. 2; for instance larger stars along a road segment would indicate the highest level experience; smaller stars indicate a slightly lesser experience, and perhaps even smaller stars for another level of experience, but enjoyable nevertheless; another embodiment might indicate the level of the experience that can be expected by the use of various sized dots as in FIG. 3. A different embodiment could use alterations to the surface of the map such as indentions, bumps or ridges to attract the user's eye to these specific road segments. Other embodiments could include any alteration or attachment to the surface of the map which would attract the user's attention to a certain road segment such as adhering icons or symbols to the surface or by applying a layer or layers of epoxy or other thermosetting resins to the surface.

The various embodiments for indicating the road segments on the map make it easy to locate each segment, determine its length, and the level of experience that one can expect; to facilitate this feature, and to give definition to the segment designations, there would be an index on the back side of the map similar to that described above (L10), but instead of cities and towns the index would list these interesting road segments alphabetically by their common name, e.g., McClure Pass, Arapaho Pass, Independence Pass, and so on; so that a user who may have heard of "McClure Pass", can now find it in the index, and then by using the letter and number code he/she could easily locate it on the map (depending on the embodiment used, it will be identified by color, stars, dots, dashed lines, etc.). Furthermore, this application will be particularly useful to a traveler who is passing through a particular area, and is desirous of experiencing some great scenery along the way, or to enjoy the type of road that would be more applicable to the motorcyclist versus the monotony of the interstate highway system. The traveler can simply view the map to preplan the most suitable route(s) to pass through as many of these easily identifiable scenic road segments as possible en route to a specific destination. Generally, the typical road maps that are available in the market (prior art) focus more on efficiency and expediency in passing through a mountain state, whereas this application would offer a different experience-one that would make the journey through (say Colorado) to the destination state (say California) a memorable or exploratory experience, in lieu of simply saving time to arrive at a destination. The application that is sought to be patented would succinctly define the difference between what is now available, and what would be of service to a part of the traveling market that is not being served.

A map for Recreational Vehicles could use the same method of indicating road segments which might be of interest, but the criteria for choosing the road segments would likely vary. For example, RVers (sic) might not be able to access certain mountain passes that a motorcyclist could negotiate without much trouble; so the indicated road segments would likely differ to some extent; however, information and data depicted on an RV map could indicate more seasons of enjoyment, where the motorcycle map would delimit the seasons to certain months that would be safe and memorable for those users. Another variation would be a general use road map (not specific to any class of vehicle), that would incorporate features of prior art of road maps and those features envisioned by the applicants, specifically the indicated road segments as illustrated in the motorcycle and RV examples above. Our application would embellish or elaborate upon what is now the prior art road maps by focusing or tailor-making those maps to certain venues of the touring or traveling market that require more information regarding seasons, topography concerns, safety, and pleasure; viz., our application would foment in the market place an esoteric and distinct display for users that require more information to subserve their enjoyment and safety on the road; our application would serve the esoteric and separate nature of these markets, i.e., motorcycles, RV users, bi-cyclists, and any motor-vehicle user that opts for a more visual or sensational display of the information, e.g., parts of the road that denote passes, mountains, lakes, rivers, etc., and the level of experience that the user can expect along that designated part of the road. In essence, our application would respond to the unfulfilled needs and requirements of a specific genre' of the traveling or touring market, including the motorcyclist or the RV traveler; the motorcyclist is a different entity or being on the highway than the automobile, bus or freight-hauling semi; his/her needs and pre-requisites for safety and enjoyment require a different application on a map than what is presently available (prior art) in today's marketplace.

DRAWINGS-FIGURES

FIGS. 1, 2 and 3 show three different embodiments of the proposed invention; FIG. 1 uses different shades of color (cross-hatching) to distinguish between levels of enjoyment that can be anticipated on each of the indicated road segments. FIGS. 2 and 3 use symbols, stars and dots, respectively, of different sizes to visually advise the rider or driver of the levels of enjoyment that can be anticipated along these indicated road segments.

DETAILED DESCRIPTION OF FIGS. 1, 2, AND 3

FIG. 1 uses three different types of cross-hatching, which in a color format could be three different hues or three different shades of the same color, to indicate to the motorcycle rider, bicycle rider, or vehicle driver that there are three different levels of experience that can be expected along the three differently indicated road segments; the depicted segment furthest to the left on the map, indicated by the least dense cross-hatching, would suggest to the map user that he/she can expect a "Good" experience (based on the criteria established by the map makers for that particular map) along that road segment for the distance indicated by the length of the cross-hatching.

The road segment located in the middle indicated by moderately dense cross-hatching would suggest that a "Very Good" experience can be expected; for example, and in the case of a motorcycle map, this might suggest a visually dramatic ride with winding turns along a river, which is the type of ride that motorcyclists often seek for enjoyment. The road segment furthest to the right on the map indicated by dense cross-hatching, represents what the map maker considers to be an "Excellent" experience, which in this embodiment would be the highest level of experience according to the criteria established by the map makers for this map. Continuing with the motorcycle map example, this "Excellent" experience might include a ride over a mountain summit with rapid ascents and descents, sharp turns, switchbacks, and dramatic scenery for the length of the road segment indicated by the dense cross-hatching, providing the highest level of experience for a motorcyclist based on the criteria established by the map maker. An object of this invention, referring to FIG. 1 and continuing with the motorcycle example, would allow the motorcyclist to choose the type of ride he/or she would prefer. For example, a rider travelling from north to south on the FIG. 1 map would have a choice of three different routes and three different levels of experience. Perhaps, given the choice of an "Excellent" experience as compared to a "Good" or "Very Good" experience, the rider might choose an "Excellent" experience; or where time might be a constraint, he/she might simply opt for a "Good" experience, but nevertheless, a "motorcycle" experience.

FIG. 2 uses different sized stars to visually indicate different levels of experience that can be expected along the indicated road segments. There are two levels of enjoyment indicated on FIG. 2, the smaller stars indicate a "Very Good" experience and the larger stars evidence that an "Excellent" experience can be expected.

FIG. 3 uses three different sized dots along the chosen road segments to indicate the different levels of experience that can be expected along the separate road segments; viz., the smallest dots evidencing that a "Good" experience can be expected, based on the criteria established by the map maker; the medium sized dots indicating a "Very Good" experience, and the largest dots presaging an "Excellent" experience. FIGS. 1, 2, and 3 provide three different ways of presenting the same information on a map surface; in the case of FIG. 1 different colors (indicated by cross-hatching) or different shades of the same color express three different levels of experience that can be expected along the indicated road segments. FIGS. 2 and 3 provide examples of other ways to indicate these different levels of experience on perhaps different types of maps. There are numerous other symbols or icons that could be substituted for the stars, cross-hatching and dots in FIGS. 2 and 3 including: arrows, hash marks, dashed lines, or asterisks.

We claim:

1. A method of presenting information on a road map by distinctively visually indicating segments of existing roadways that, when traveled, will provide certain experiences to a traveler, comprising:

providing first identification means at an existing segment of a roadway on a map, the segment having met certain criteria established by a maker, designer or printer of the map, to visually indicate a level of enjoyment anticipated or expected along the road segment as a result of change in vehicle direction or elevation;

providing at least second identification means at an additional existing segment of said roadway on the map, the additional existing segment having also met certain criteria established by the maker, designer or printer of the map, to visually indicate a greater level of enjoyment anticipated or expected along the additional existing segment as a result of a greater change in vehicle direction or elevation;

whereby the first and second identification means can comprise at least one of:

varying shades of color overlaid onto existing segments of roadways on a map to indicate different levels of enjoyment;

varying sizes or arrangement of symbols including dots, hash marks, dashed lines, arrows, circles or lines at segments of roadways on a map to indicate different levels of enjoyment;

varying sizes or arrangement of change in texture of the map surface at roadway segments including mechanically created indentions, bumps and ridges, to indicate different levels of enjoyment;

or by varying sizes or arrangements of icons or symbols at roadway segments on a map, to indicate different levels of enjoyment.

2. A method of presenting information on a road map as described in claim 1, wherein the segments of the roadmap are displayed on at least one of paper, plastic, cloth or textile, that could be flexible or foldable, or displayed on a surface that is rigid.

3. A method of presenting information on a road map as described in claim 1, wherein the segments of the roadmap are displayed in a digital format using a navigation device including a Garmin™ or Tom Tom™ navigational device, or another digital device.

4. A method of presenting information on a road map as described in claim 1, further providing information on the road map pertaining to safety.

* * * * *